United States Patent
Derstine

(10) Patent No.: US 10,632,891 B2
(45) Date of Patent: Apr. 28, 2020

(54) LIFT-AND-TILT TRAILER

(71) Applicant: Paul A. Derstine, Thorp, WI (US)

(72) Inventor: Paul A. Derstine, Thorp, WI (US)

(*) Notice: Subject to any disclaimer, the term of this patent is extended or adjusted under 35 U.S.C. 154(b) by 116 days.

(21) Appl. No.: 15/947,761

(22) Filed: Apr. 6, 2018

(65) Prior Publication Data

US 2018/0290581 A1  Oct. 11, 2018

Related U.S. Application Data

(60) Provisional application No. 62/482,521, filed on Apr. 6, 2017.

(51) Int. Cl.
| | | |
|---|---|---|
| *B60P 1/34* | (2006.01) | |
| *B60P 1/16* | (2006.01) | |
| *B66F 7/00* | (2006.01) | |
| *B62D 63/06* | (2006.01) | |
| *B66F 11/04* | (2006.01) | |
| *B66F 7/06* | (2006.01) | |
| *B62D 59/04* | (2006.01) | |
| *B60D 1/66* | (2006.01) | |

(52) U.S. Cl.
CPC .................. *B60P 1/34* (2013.01); *B60P 1/162* (2013.01); *B62D 59/04* (2013.01); *B62D 63/06* (2013.01); *B66F 7/00* (2013.01); *B66F 7/0683* (2013.01); *B66F 11/042* (2013.01); *B60D 1/665* (2013.01); *B60P 1/165* (2013.01); *B62D 63/068* (2013.01)

(58) Field of Classification Search
CPC .. B60P 1/34; B60P 1/162; B60P 1/165; B60D 1/665; B62D 63/06; B62D 63/068
USPC ............................................................ 298/11
See application file for complete search history.

(56) References Cited

U.S. PATENT DOCUMENTS

| | | | | |
|---|---|---|---|---|
| 5,249,642 A * | 10/1993 | Kishi | ................... | B66F 11/046 |
| | | | | 182/2.11 |
| 6,129,226 A * | 10/2000 | Donovan | ................ | B66C 23/54 |
| | | | | 212/238 |
| 6,558,104 B1 * | 5/2003 | Vlaanderen | ........... | B60P 1/6463 |
| | | | | 414/491 |
| 6,817,677 B1 * | 11/2004 | Beiler | ....................... | B60P 1/34 |
| | | | | 298/21 R |
| 9,327,632 B1 * | 5/2016 | Bartel | ....................... | B60P 1/34 |
| 2005/0253445 A1 * | 11/2005 | Beiler | ...................... | B60P 1/16 |
| | | | | 298/22 C |
| 2008/0211289 A1 * | 9/2008 | Beiler | ...................... | B60P 1/00 |
| | | | | 298/19 R |

(Continued)

*Primary Examiner* — Hilary L Gutman

(57) ABSTRACT

A trailer lift that rises to high levels that may tilt for loading and unloading. The trailer lift includes a lift-and-tilt mechanism, a trailer base, and a trailer platform. The lift-and-tilt mechanism includes a lower-strut link, an upper-strut link, a support member, a lower lift cylinder, and an upper cylinder. The lower-strut link and the upper-strut link are pivotably and terminally attached to each other. The support member is positioned offset to the lower-strut link and is pivotably attached to the upper-strut link to guide the upper-strut link. The trailer platform is terminally and pivotably connected to the upper-strut link. Similarly, the trailer base is pivotably and terminally connected to the lower-strut link and the support member. The upper lift cylinder is pivotably mounted in between the upper-strut link and the trailer platform. The lower lift cylinder is pivotably mounted between the upper-strut link and the lower-strut link.

8 Claims, 6 Drawing Sheets

(56) References Cited

U.S. PATENT DOCUMENTS

| | | | |
|---|---|---|---|
| 2013/0229029 A1* | 9/2013 | Pierce | B60P 3/39 |
| | | | 296/176 |
| 2016/0200235 A1* | 7/2016 | Stigler | B64C 39/022 |
| | | | 296/182.1 |
| 2017/0232880 A1* | 8/2017 | Peterson | B60P 3/0255 |
| | | | 296/21 |
| 2018/0043811 A1* | 2/2018 | Beiler | B62D 51/04 |

* cited by examiner

LIFT-AND-TILT TRAILER

The current application claims a priority to the U.S. Provisional Patent application Ser. No. 62/482,521 filed on Apr. 6, 2017.

FIELD OF THE INVENTION

The present invention relates generally to towing devices and towing trailers. More specifically, the present invention is a highly mobile trailer with lifting and tilting capabilities that may be hooked up and transported by trucks, mobile homes, and other similar vehicles.

BACKGROUND OF THE INVENTION

Oftentimes, it can be hard and difficult for people to work in high places. Ladders and platforms can be tedious to put up and take down each time. Additionally, ladders and platforms are usually accompanied with a certain risk to the user. Traditional scissor lifts are limited in two main ways. The first, traditional scissor lifts are limited to heights that may be achieved. The second, traditional scissor lifts are only capable of lifting and lowering a platform.

It is therefore an object of the present invention to introduce an apparatus for a lift trailer that is capable of achieving relatively high heights and is capable of tilting in order to load and unload cargo or personnel. The present invention is a lift and tilt platform implemented as a trailer. This allows the user to easily transport the present invention by hitching up the present invention to a truck or other suitable vehicle. Additionally, the present invention utilizes a unique lifting mechanism that is capable of lifting a large load to a significant height while also being able to tilt for loading and unloading said large load.

DETAIL DESCRIPTIONS OF THE INVENTION

All illustrations of the drawings are for the purpose of describing selected versions of the present invention and are not intended to limit the scope of the present invention.

The present invention generally relates towing devices and lift platforms. More specifically, the present invention is a lift platform on wheels capable of lifting a user and or a load(s) to a certain height.

Figure 1:
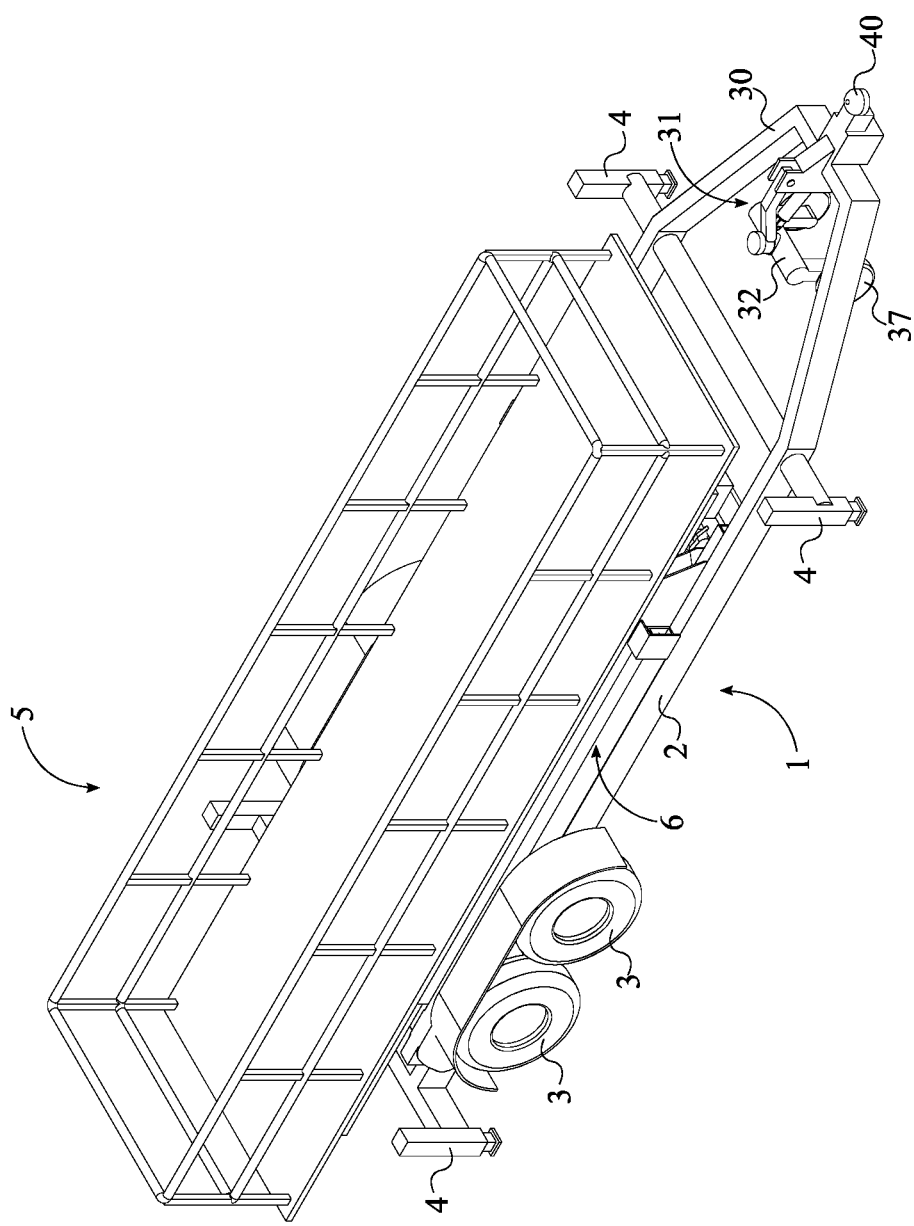
FIG. 1 is a perspective view of the present invention in a collapsed configuration.
Figure 6:
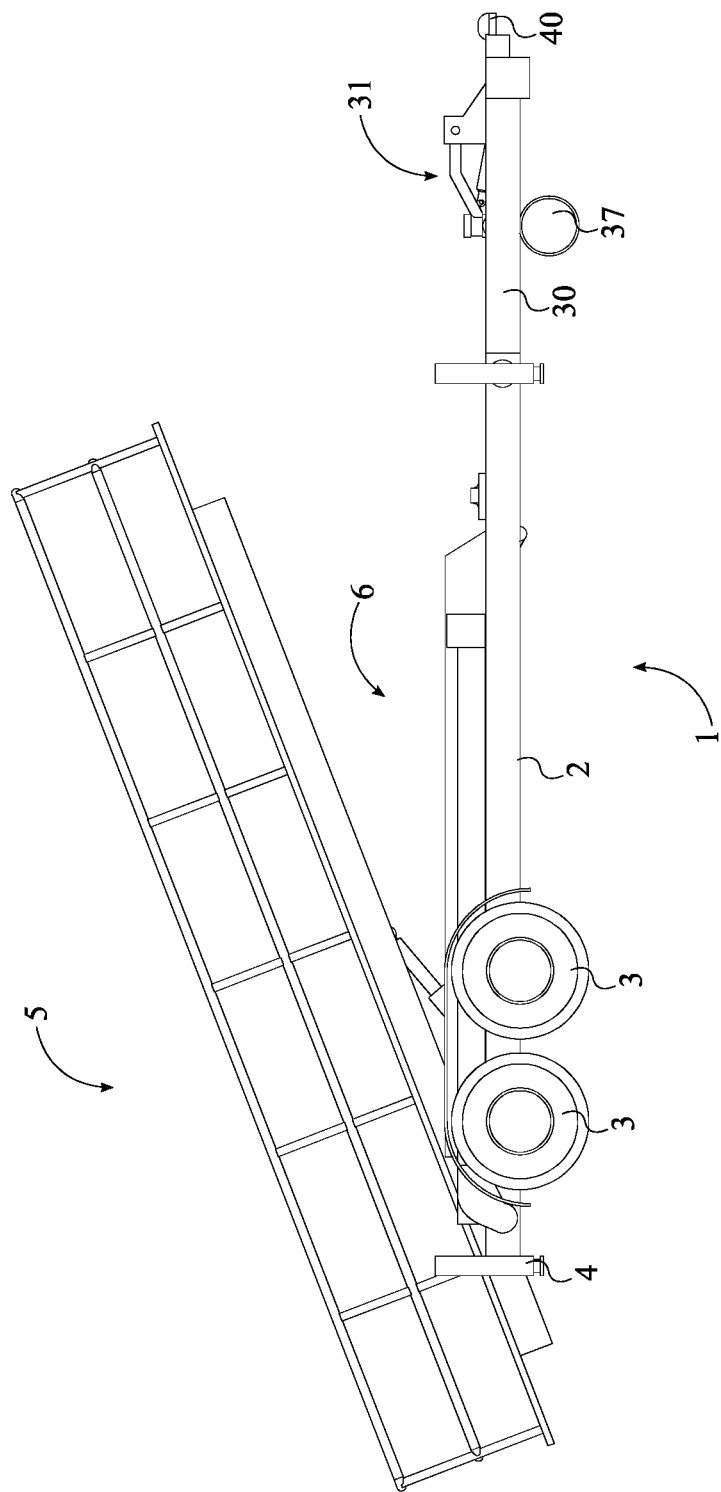
FIG. 6 is a side-view of the present invention in an unloading configuration.

Referring to FIG. 1, the present invention comprises a trailer base 1, a trailer platform 5, and an at least one lift-and-tilt mechanism 6. The trailer base 1 acts as the support structure for the present invention. The trailer platform 5 is a support structure for personnel, items, and activities that raises and lowers relative to the trailer base 1. Additionally, the trailer platform 5 may also be rotated at an angle relative to the trailer base 1 for loading and unloading purposes as seen in FIG. 6. The lift-and-tilt mechanism 6 is a scissor-like lift mechanism that raises, lowers, and tilts the trailer platform 5 relative to the trailer base 1. To achieve this, the lift-and-tilt mechanism 6 is positioned and mechanically integrated in between the trailer base 1 and the trailer platform 5. More specifically, the lift-and-tilt mechanism 6 comprises a lower-strut link 7, an upper-strut link 8, a support member 9, a lower lift cylinder 10, and an upper lift cylinder 13. The lower-strut link 7, the upper-strut link 8, and the support member 9 are each an elongated structural beam composed of a strong metal or other similar material. The lower-strut link 7 and the support member 9 mechanically couple the lift-and-tilt mechanism 6 to the trailer base 1. Similarly, the upper-strut link 8 mechanically couples the lift-and-tilt mechanism 6 to the trailer platform 5. The lower-strut link 7 and the upper-strut link 8 are terminally and pivotably connected to each other about a second axis 19 such that any angular displacement in between raises or lowers the height of the trailer platform 5 relative to the trailer base 1.

The support member 9 is an elongated beam which couples the upper-strut link 8 to the trailer base 1 and mechanically guides the upper-strut link 8. In particular, the support member 9 guides the upper-strut link 8 along a semi-circular path, thus raising and lowering the trailer platform 5 relative to the trailer base 1. For this, the support member 9 is positioned offset to the lower-strut link 7, along the upper-strut link 8, with the upper-strut link 8 being terminally and pivotably connected to the support member 9 about a fifth axis 22. Additionally, the support member 9 also provides lateral support to the lift-and-tilt mechanism 6. Opposite to the upper-strut link 8, the trailer base 1 is terminally and pivotably connected to the support member 9 and the lower-strut link 7; the trailer base 1 is pivotably connected to the lower-strut link 7 about a third axis 20; and, the trailer base 1 is pivotably connected to the support member 9 about a fourth axis 21. Opposite to the lower-strut link 7, the trailer platform 5 is terminally and pivotably connected to the upper-strut link 8 about a first axis 18. The pivot connection allows the trailer platform 5 to stay oriented parallel to the trailer base 1 as the trailer platform 5 is raised or lowered relative to the trailer base 1. Additionally, said pivot connection allows the trailer platform 5 to be angled relative to the trailer base 1 for loading and unloading purposes.

Figure 3:
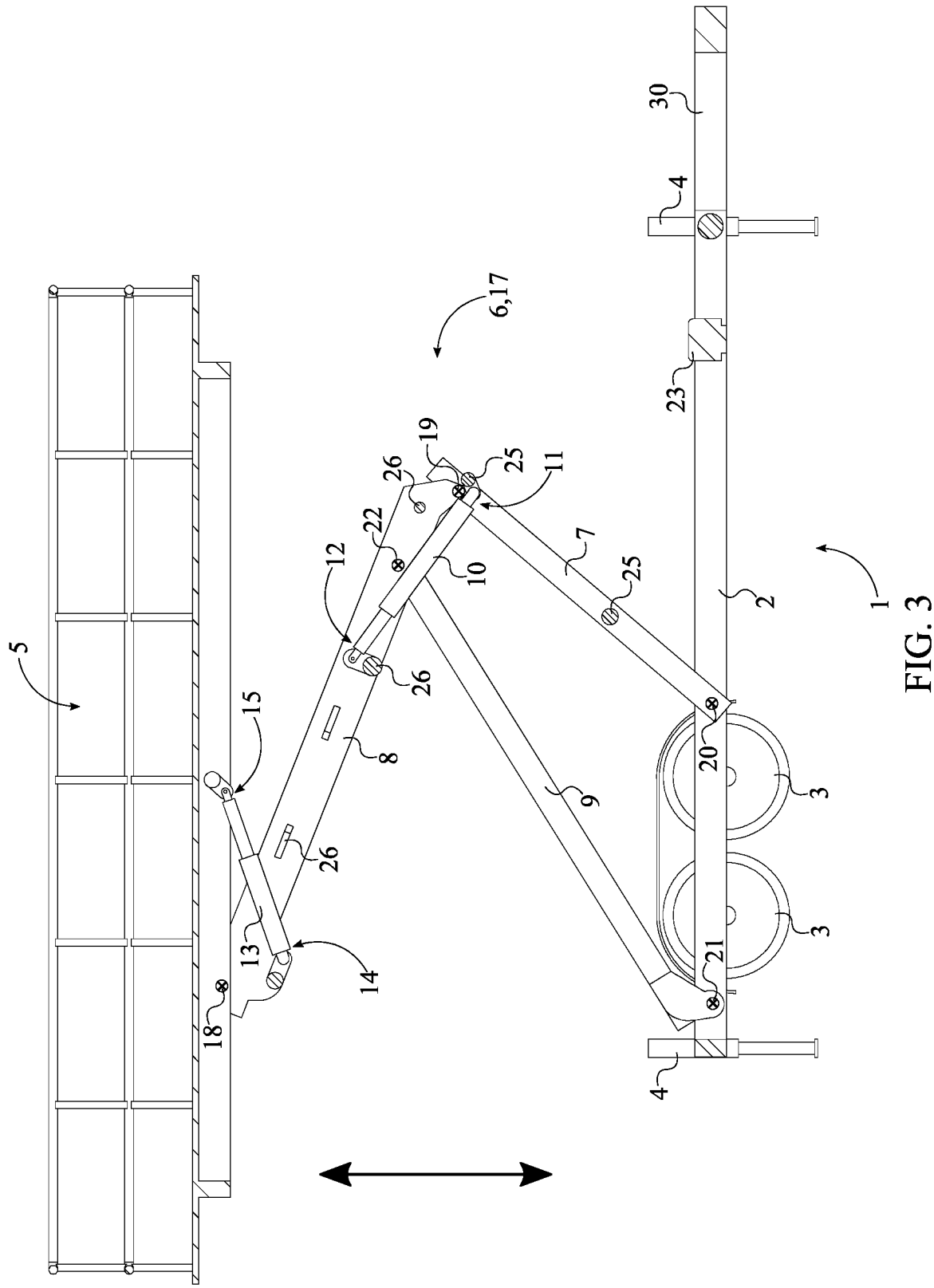
FIG. 3 is a cross-section view of the present invention.

Referring to FIG. 3, the first axis 18, the second axis 19, the third axis 20, the fourth axis 21, and the fifth axis 22 are all oriented parallel to each other. Additionally, the third axis 20 and the fourth axis 21 are positioned offset to each other along the trailer base 1. Furthermore, the second axis 19 and the fifth axis 22 are positioned offset to each other along the upper-strut link 8. This positions the support member 9 offset to the lower-strut link 7 and thus provides a semi-circular path for the lower-strut link 7 to follow when the lift-and-tilt mechanism 6 is engaged and raises the trailer platform 5 away from the trailer base 1. In one embodiment, the distance between the first axis 18 and the second axis 19 is 172 inches; the distance between the second axis 19 and the fifth axis 22 is 24 inches; the distance between the second axis 19 and the third axis 20 is 104 inches; the distance between the third axis 20 and the fourth axis 21 is 65 inches; and the distance between the fourth axis 21 and the fifth axis 22 is 145 inches. This ensures the trailer platform 5 raise and lowers in a linear fashion.

The lower lift cylinder 10 and the upper lift cylinder 13 are the driving mechanisms for the lift-and-tilt mechanism 6. In particular, the lower lift cylinder 10 and the upper lift cylinder 13 are each a mechanical actuator that provides a unidirectional force for linear displacement. The upper lift cylinder 13 controls the angle displacement between the upper-strut link 8 and the trailer platform 5. Thus, the upper lift cylinder 13 is pivotably mounted in between the upper-strut link 8 and the trailer platform 5. More specifically, a first end 14 of the upper lift cylinder 13 is pivotably mounted to the upper-strut link 8, adjacent to the first axis 18. A second end 15 of the upper lift cylinder 13 is pivotably mounted to the trailer platform 5. For mechanical leverage, the second end 15 of the upper lift cylinder 13 is positioned offset to the first axis 18.

The lower lift cylinder 10 controls the angle displacement between the lower-strut link 7 and the upper-strut link 8. The lower lift cylinder 10 is pivotably mounted in between the lower-strut link 7 and the upper-strut link 8. More specifically, a first end of the lower-strut link 7 is pivotably mounted to the lower-strut link 7, adjacent to the second axis 19. A second end 12 of the lower lift cylinder 10 is pivotably mounted to the upper-strut link 8, adjacent to the second axis 19. Resultantly, the first end 14 of the upper lift cylinder 13 and the second end 12 of the lower lift cylinder 10 are positioned offset to each other along the upper-strut link 8. Additionally, the fourth axis 21 is positioned in between the second end 12 of the lower lift cylinder 10 and the second axis 19 to provide the lower lift cylinder 10 additional mechanical advantage. In general, the lower lift cylinder 10 provides the displacement/force which raises and lowers the trailer platform 5 relative to the trailer base 1 while the upper lift cylinder 13 controls the angular orientation of the trailer platform 5.

In the preferred embodiment, the trailer base 1 comprises a structural frame 2, an at least one pair of wheels 3, and a plurality of drop-legs 4. The structural frame 2 preferably comprises four structural beams arranged into a rectangular shape, similar to traditional trailer designs. An internal space within the rectangular shape receives a portion of the lift-and-tilt mechanism 6 when the present invention is positioned into a collapsed configuration. In the collapsed configuration, the trailer platform 5 is positioned parallel and adjacent to the trailer base 1. Additionally, other peripheral components of the present invention are mounted within the internal space. The pair of wheels 3 allow the present invention to translate along a surface. The pair of wheels 3 are coaxially positioned opposite to each other, across the structural frame 2 with each of the pair of wheels 3 being laterally and rotatably mounted to the structural frame 2. In the preferred embodiment of the present invention, the at least one pair of wheels 3 includes a first set of wheels and a second set of wheels; wherein, the first set of wheels and the second set of wheels are offset to each other along the trailer base 1. Each of the plurality of drop-legs 4 is an elongated lift/displacement cylinder. The plurality of drop-legs 4 raises the structural frame 2 and thus elevate the present invention relative to the ground and anchor the present invention in place, similar to traditional scissor lifts and cranes. The plurality of drop-legs 4 is parametrically distributed about the structural frame 2. Each of the plurality of drop-legs 4 is oriented normal to the structural frame 2 and each of the plurality of drop-legs 4 is laterally mounted to the structural frame 2. The size, load, and type of lift/displacement cylinder may be subject to change. For example, in one embodiment, each of the plurality of drop-legs 4 is an electric linear actuator that is powered by an internal or an external power source, such as a battery or another power source. In the preferred embodiment of the present invention, each of the plurality of drop-legs 4 is a hydraulic lift cylinder powered by an internal or an external pump.

Figure 5:
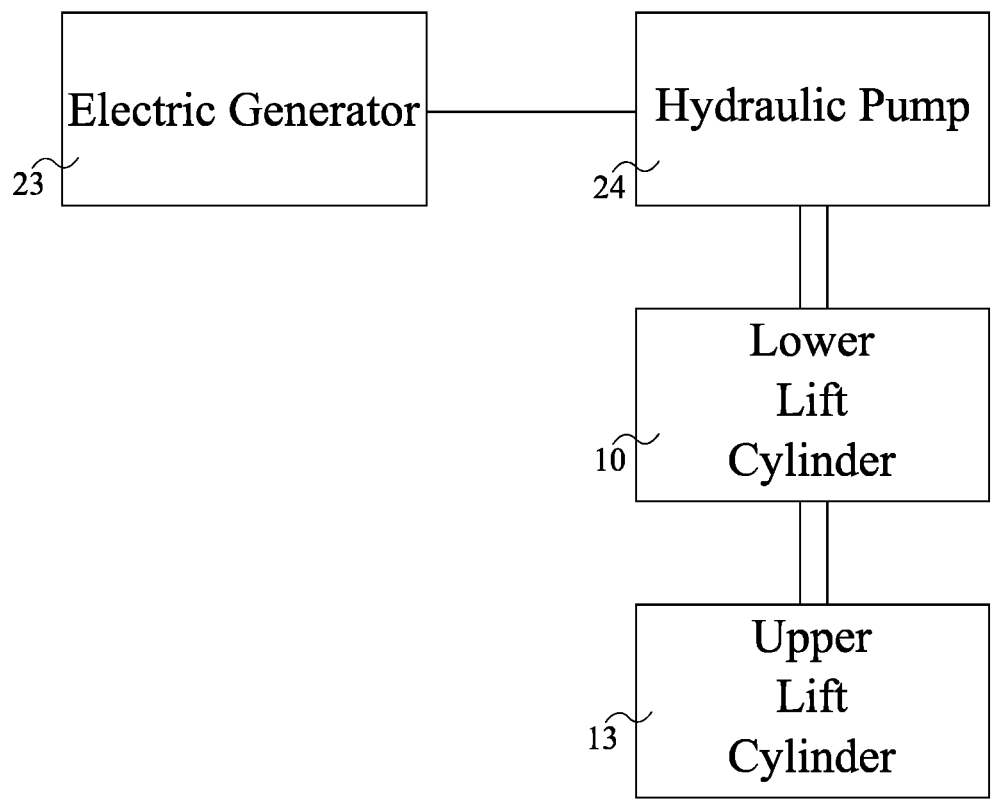
FIG. 5 is a schematic diagram of the present invention depicting the electrical and fluid connections between a hydraulic pump, an electric generator, a lower lift cylinder, and an upper lift cylinder.

Referring to FIG. 5, the present invention further comprises an electric generator 23 and an at least one hydraulic pump 24. The electric generator 23 is a device that converts mechanical energy into electrical power. In the preferred embodiment of the present invention, the electric generator 23 is a small internal combustion engine which is powered by a combustible source such as gasoline fuel or diesel fuel. The electricity produced by the electric generator 23 is used specifically to power the hydraulic pump 24; but the electric generator 23 may also be used to power any peripheral electrical components of the present invention such as brake lights, lights, control panels, and other similar devices. The hydraulic pump 24 uses mechanical devices to displace and apply pressure to a fluid in order to create flow within the fluid. The electric generator 23 and the hydraulic pump 24 are mounted to the trailer base 1 with the electric generator 23 being electrically connected to the hydraulic pump 24. In the preferred embodiment of the present invention, the lower lift cylinder 10 and the upper lift cylinder 13 are each a hydraulic lift. Additionally, the hydraulic pump 24, the lower lift cylinder 10, and the upper lift cylinder 13 are in fluid communication with each other. In general, the hydraulic pump 24 powers and thus controls the displacement of the lower lift cylinder 10 and the upper lift cylinder 13. Resultantly, present invention is capable of self-leveling as the trailer base 1 is raised and lowered relative to the trailer base 1. More specifically, the hydraulic pump 24 first feeds fluid to the lower lift cylinder 10, the master lift, which begins to raise the upper-strut link 8. As the pressure within the lower lift cylinder 10 reaches a specific limit, fluid is then fed to the upper lift cylinder 13 in order to displace the upper lift cylinder 13 and change the angle between the trailer platform 5 and the upper strut link. The displacement value varies as the trailer platform 5 is raised in order to keep the trailer platform 5 oriented parallel to the trailer base 1. In general, the upper lift cylinder 13 and the lower lift cylinder 10 in a master and slave configuration. Additional pumps, pressure gauges, pressure valves, and other similar devices may be used to keep the trailer platform 5 oriented parallel to the trailer base 1.

The present invention may also comprise an at least one control panel. The control panel provides the user a means of controlling the hydraulic pump 24, the electric generator 23, the lower lift cylinder 10, the upper lift cylinder 13, and any other electrical or hydraulic component of the present invention. In general, through the aforementioned components, the control panel directs the height and orientation of the trailer platform 5 relative to the trailer base 1. The control panel is electrically connected to the electric generator 23, the hydraulic pump 24, and any other electrical component of the present invention. The control panel may be mounted directly to the trailer base 1, the trailer platform 5, or may be wireless. Additionally, the at least one control panel may comprise a set of control panels, each connected and in charge or different components of the present invention and each being mounted at specific positions on the present invention.

Figure 2:
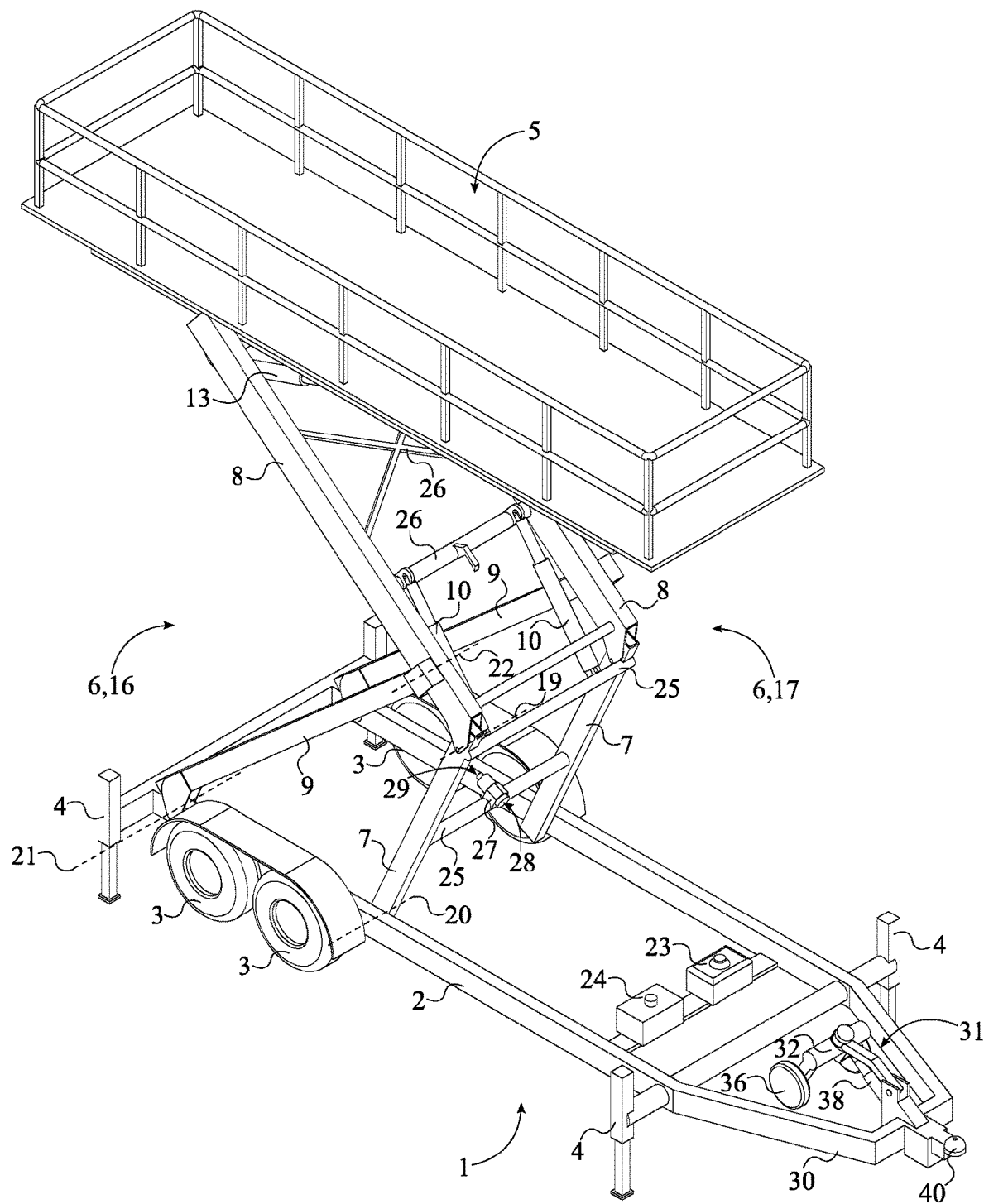
FIG. 2 is a perspective view of the present invention in an extended configuration.

Referring to FIG. 1 and FIG. 2, the preferred embodiment is designed for industrial use, i.e. the present invention is capable of raising, lowering, tilting, and carrying high loads and is capable of lifting said load to a relative high state. For this, the present invention further comprises a plurality of lower crossmembers 25, a plurality of upper crossmembers 26, and the scissor-lift mechanism comprises a first linkage 16 and a second linkage 17. The first linkage 16 and the second linkage 17 act as two identical mirror-like legs for the trailer platform 5. More specifically, the first linkage 16 and the second linkage 17 are oriented parallel to each other. Additionally, the first linkage 16 and the second linkage 17 are positioned offset to each other across the trailer base 1 and the trailer platform 5. The first linkage 16 and the second linkage 17 extend, lower, and tilt the trailer platform 5 in unison to laterally and equally support the trailer platform 5. To ensure this, the first linkage 16 and the second linkage 17 are physically coupled together by the plurality of lower crossmembers 25 and the plurality of upper crossmembers 26. More specifically, each of the plurality of lower crossmembers 25 and each of the plurality of upper crossmembers 26 is an elongated structural member such as a beam. The plurality of lower crossmembers 25 connect the lower-strut link 7 of the first linkage 16 and the lower-strut link 7 of the second linkage 17. More specifically, the plurality of lower crossmembers 25 is distributed along the lower-strut link 7 of the first linkage 16 and the lower-strut link 7 of the second linkage 17. Each of the plurality of lower crossmembers 25 is connected in between the lower-strut link 7 of the first linkage 16 and the lower-strut link 7 of the second linkage 17. Similarly, the plurality of upper crossmembers 26 is distributed along the upper-strut link of the first linkage 16 and the upper-strut link 8 of the second linkage 17. Each of the plurality of lower crossmembers 25 is connected in between the upper-strut link 8 of the first linkage 16 and the upper-strut link 8 of the second linkage 17. The number within the plurality of lower crossmembers 25 and the number within the plurality of upper crossmembers 26 is subject to change to meet the needs and preferences of the user.

Referring to FIG. 1, in the collapsed configuration, the trailer platform 5 is positioned adjacent and parallel to the trailer base 1 with the lift-and-tilt mechanism 6 being collapsed in between the aforementioned components. In order to initiate lifting or tilting, an initial lift cylinder 27 may be used to provide the lift-and-tilt mechanism 6 additional mechanical advantage. The initial lift cylinder 27 is either an electric or a hydraulic lift/displacement cylinder. The initial lift cylinder 27 is positioned in between the first linkage 16 and the second linkage 17. A first end 28 of the initial lift cylinder 27 is perpendicularly connected to a select lower member from the plurality of lower crossmembers 25. A second end 29 of the initial lift cylinder 27 is pressed against a select upper member from the plurality of upper crossmembers 26. When activated, the initial lift cylinder 27 extends and pushes the select upper member away from the select lower member. This marginally raises the trailer platform 5 away from the trailer base 1, thus providing the necessary mechanical advantage for the lift-and-tilt mechanism 6 to take over and raise the trailer platform 5 to the desired height and orientation.

Figure 4:
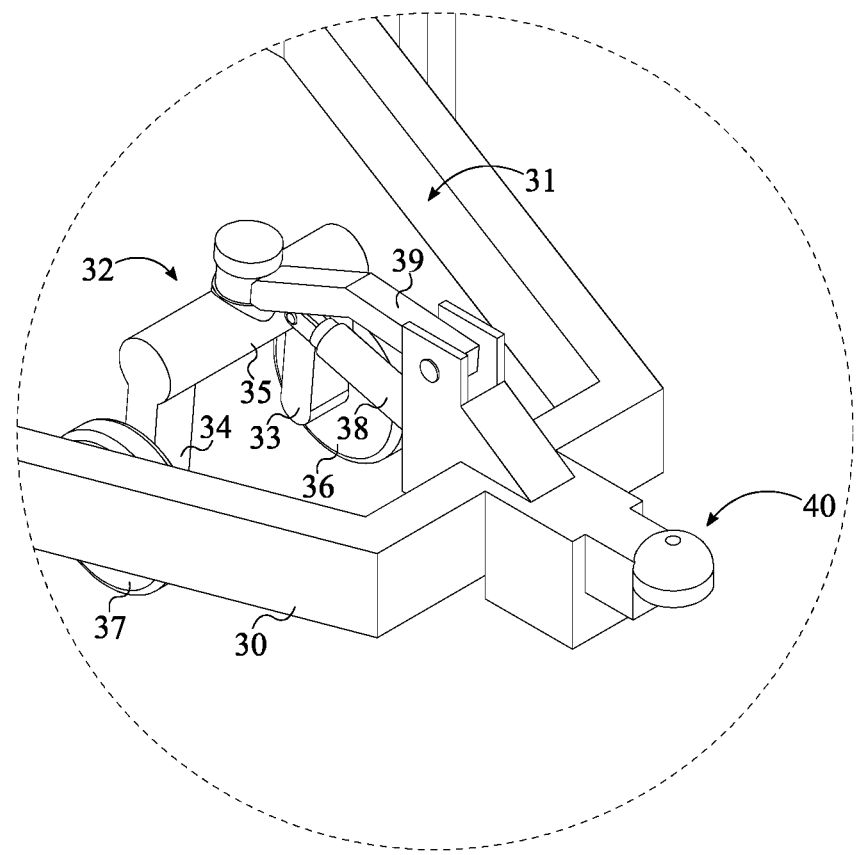
FIG. 4 is a detailed view of a drive wheel assembly of the present invention.

Referring to FIG. 4, in the preferred embodiment, the present invention further comprises a triangular-shaped frame 30, a trailer hitch coupler 40, and a drive wheel assembly 31. The triangular-shaped frame 30 mounts to the trailer base 1 and supports the trailer hitch coupler 40 and the drive wheel assembly 31. In particular, the triangular-shaped frame 30 is laterally connected to the trailer base 1. The drive wheel assembly 31 enables the user to easily attach and detach the trailer hitch coupler 40 to a complimentary hitch of a vehicle. For this, the trailer hitch coupler 40 is positioned adjacent to the triangular-shaped frame 30, opposite to the trailer base 1. Additionally, the trailer hitch coupler 40 is laterally connected to the triangular-shaped frame 30. The drive wheel assembly 31 also moves the present invention on the ground in any direction. For this, the drive wheel assembly 31 is positioned within the triangular-shaped frame 30. The drive wheel assembly 31 comprises a U-shaped frame 32, a first motorized wheel 36, a second motorized wheel 37, a control lift cylinder 38, and a mount arm. The U-shaped frame 32 serves as axle-type component and supports the first motorized wheel 36 and the second motorized wheel 37. The first motorized wheel 36 and the second motorized wheel 37 are each an independently powered wheel capable of rotating in any direction. The first motorized wheel 36 is perpendicularly and rotatably mounted to a first leg 33 of the U-shaped frame 32. Similarly, the second motorized wheel 37 is perpendicularly and rotatably mounted to a second leg 34 of the U-shaped frame 32. Resultantly, the first motorized wheel 36 and the second motorized wheel 37 can translate the U-shaped frame 32 as well as perform zero-turn steering. The mounting arm 39 connect the U-shaped frame 32 to the triangular-shaped frame 30. In particular, the mounting arm 39 is rotatably and centrally mounted to a connecting web 35 of the U-shaped frame 32 at a first end. In particular, a rotation axis of the U-shaped frame 32 is oriented perpendicular to the mounting arm 39. At the second end, the triangular-shaped frame 30 is terminally and rotatably connected to the mounting arm 39, opposite to the U-shaped frame 32 as seen in FIG. 4. Resultantly, the U-shaped frame 32 is capable of rotating relative to the mounting arm 39, allowing for zero-turn steering.

The control lift cylinder 38 tilts the drive wheel assembly 31 relative to the triangular-shaped frame 30, towards and away from the triangular-shaped frame 30. This in result engages or disengages the first motorized wheel 36 and the second motorized wheel 37 against the ground. In particular, the control lift cylinder 38 is pivotably mounted in between the mounting arm 39 and the triangular-shaped frame 30. This allows the drive assembly to be retracted within the triangular-shaped frame 30 or be lowered to engage the ground. Additionally, the drive assembly may be lowered to a point where the whole triangular-shaped frame 30, and a portion of the trailer base 1, is lifted off of the ground. This marginal vertical translation allows the user to either engage or disengage the trailer hitch coupler 40.

Any number of pumps, batteries, electric generators, and any other necessary peripheral devices may be used to control the subcomponents of the present invention including, but not limited to, the lower lift cylinder 10, the upper lift cylinder 13, the control panel, the initial lift cylinder 27, and the control lift cylinder 38.

Although the invention has been explained in relation to its preferred embodiment, it is to be understood that many other possible modifications and variations can be made without departing from the spirit and scope of the invention as hereinafter claimed.

What is claimed is:
1. A lift-and-tilt trailer comprises:
an at least one lift-and-tilt mechanism;
a trailer base;
a trailer platform;
the lift-and-tilt mechanism comprises a lower-strut link, an upper-strut link, a support member, a lower lift cylinder, and an upper lift cylinder;
the lift-and-tilt mechanism being positioned in between the trailer base and the trailer platform;

the lower-strut link and the upper-strut link being terminally and pivotably attached to each other;
the support member being positioned offset to the lower-strut link along the upper-strut link;
the upper-strut link being terminally and pivotably connected to the support member;
the trailer platform being terminally and pivotably connected to the upper-strut link, opposite the lower-strut link;
the trailer base being terminally and pivotably connected to the lower-strut link and the support member, opposite the upper-strut link;
the upper lift cylinder being pivotably mounted in between the upper-strut link and the trailer platform;
the lower lift cylinder being pivotably mounted in between the lower-strut link and the upper-strut link;
a plurality of lower crossmembers;
a plurality of upper crossmembers;
the at least one lift-and-tilt mechanism comprises a first linkage and a second linkage;
the first linkage and the second linkage being oriented parallel to each other;
the first linkage and the second linkage being positioned offset to each other across the trailer base and the trailer platform;
the plurality of lower crossmembers being distributed along the lower-strut link of the first linkage and the lower-strut link of the second linkage;
each of the plurality of lower crossmembers being connected in between the lower-strut link of the first linkage and the lower-strut link of the second linkage;
the plurality of upper crossmembers being distributed along the upper-strut link of the first linkage and the upper-strut link of the second linkage;
each of the plurality of upper crossmembers being connected in between the upper-strut link of the first linkage and the upper-strut link of the second linkage;
an initial lift cylinder;
wherein the lift-and-tilt mechanism, the trailer platform, and the trailer base are configured into a collapsed configuration;
the trailer platform being positioned parallel and adjacent to the trailer base;
the initial lift cylinder being positioned in between the first linkage and the second linkage;
a first end of the initial lift cylinder is perpendicularly connected to a select lower member from the plurality of lower crossmembers; and
a second end of the initial lift cylinder being pressed against a select upper member from the plurality of upper crossmembers.

2. The lift-and-tilt trailer as claimed in claim 1 comprises:
the trailer platform being pivotably connected to the upper-strut link about a first axis;
the upper-strut link and the lower-strut link being pivotably connected to each other about a second axis;
the trailer base being pivotably connected to the lower-strut link about a third axis;
the trailer base being pivotably connected to the support member about a fourth axis;
the upper-strut link being pivotably connected to the support member about a fifth axis;
the first axis, the second axis, the third axis, the fourth axis, and the fifth axis being oriented parallel to each other;
the third axis and the fourth axis being positioned offset to each other along the trailer base; and
the second axis and the fifth axis being positioned offset to each other along the upper-strut link.

3. The lift-and-tilt trailer as claimed in claim 2 comprises:
a first end of the upper lift cylinder and a second end of the lower lift cylinder being positioned offset to each other along the upper-strut link;
the first end of the upper lift cylinder being pivotably mounted to the upper-strut link, adjacent to the first axis;
a second end of the upper lift cylinder being positioned offset to the first axis along the trailer platform; and
the second end of the upper lift cylinder being pivotably mounted to the trailer platform.

4. The lift-and-tilt trailer as claimed in claim 2 comprises:
a first end of the upper lift cylinder and a second end of the lower lift cylinder being positioned offset to each other along the upper-strut link;
the second end of the lower lift cylinder being pivotably mounted to the upper-strut link, adjacent to the second axis;
a first end of the lower lift cylinder being pivotably mounted to the lower-strut link, adjacent to the second axis; and
the fourth axis being positioned in between the second end of the lower lift cylinder and the second axis.

5. The lift-and-tilt trailer as claimed in claim 1 comprises:
the trailer base comprises a structural frame, an at least one pair of wheels, and a plurality of drop-legs;
the plurality of drop-legs being perimetrically distributed about the structural frame;
each of the plurality of drop-legs being oriented normal to the structural frame;
each of the plurality of drop-legs being laterally mounted to the structural frame;
the pair of wheels being coaxially positioned opposite to each other, across the structural frame; and
each of the pair of wheels being laterally and rotatably mounted to the structural frame.

6. The lift-and-tilt trailer as claimed in claim 1 comprises:
an electric generator;
an at least one hydraulic pump;
the lower lift cylinder and the upper lift cylinder being a hydraulic lift;
the hydraulic pump and the electric generator being mounted to the trailer base;
the hydraulic pump, the lower lift cylinder, and the upper lift cylinder being in fluid communication with each other; and
the electric generator being electrically connected to the hydraulic pump.

7. The lift-and-tilt trailer as claimed in claim 1 comprises:
a triangular-shaped frame;
a drive wheel assembly;
the drive wheel assembly comprises a U-shaped frame, a first motorized wheel, a second motorized wheel, a control lift cylinder, and a mounting arm;
the triangular-shaped frame being laterally connected to the trailer base;
the drive wheel assembly being positioned within the triangular-shaped frame;
the first motorized wheel being perpendicularly and rotatably mounted to a first leg of the U-shaped frame;
the second motorized wheel being perpendicularly and rotatably mounted to a second leg of the U-shaped frame;
the mounting arm being rotatably and centrally mounted to a connecting web of the U-shaped frame;

the triangular-shaped frame being terminally and rotatably connected to the mounting arm, opposite to the U-shaped frame; and the control lift cylinder being pivotably mounted in between the mounting arm and the triangular-shaped frame.

8. The lift-and-tilt trailer as claimed in claim 7 comprises:

a trailer hitch coupler;

the trailer hitch coupler being positioned adjacent to the triangular-shaped frame, opposite to the trailer base; and the trailer hitch coupler being laterally connected to the triangular-shaped frame.

\* \* \* \* \*